United States Patent
Diehl et al.

(10) Patent No.: US 12,086,221 B2
(45) Date of Patent: Sep. 10, 2024

(54) MULTI-FACTOR AUTHENTICATION FOR VIRTUAL REALITY

(71) Applicants: Sony Corporation, Tokyo (JP); Sony Pictures Entertainment Inc., Culver City, CA (US)

(72) Inventors: Eric Diehl, Culver City, CA (US); Scot Barbour, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 52 days.

(21) Appl. No.: 16/265,521

(22) Filed: Feb. 1, 2019

(65) Prior Publication Data

US 2020/0250284 A1 Aug. 6, 2020

(51) Int. Cl.
| | | |
|---|---|---|
| *G06F 21/32* | (2013.01) | |
| *G06F 3/01* | (2006.01) | |
| *G06F 3/0482* | (2013.01) | |
| *G06F 21/36* | (2013.01) | |
| *G06V 40/20* | (2022.01) | |

(52) U.S. Cl.
CPC .............. *G06F 21/32* (2013.01); *G06F 3/012* (2013.01); *G06F 3/013* (2013.01); *G06F 3/017* (2013.01); *G06F 3/0482* (2013.01); *G06F 21/36* (2013.01); *G06V 40/20* (2022.01)

(58) Field of Classification Search
CPC .......... G06F 21/32; G06F 3/013; G06F 3/017; G06F 21/36; G06F 3/012; G06F 3/0482; G06F 3/04815; G06F 3/011; G06F 21/46; G06K 9/00335; H04L 2463/082; H04L 63/08; G06V 40/20; G06V 40/10
See application file for complete search history.

(56) References Cited

U.S. PATENT DOCUMENTS

| | | | |
|---|---|---|---|
| 8,648,799 B1 * | 2/2014 | Lloyd | G06F 3/0346 |
| | | | 345/169 |
| 10,146,333 B1 * | 12/2018 | Smith | G06F 3/017 |

(Continued)

FOREIGN PATENT DOCUMENTS

| | | |
|---|---|---|
| CN | 106325517 A | 1/2017 |
| CN | 107508826 A | 12/2017 |

(Continued)

OTHER PUBLICATIONS

Yu et al. "Tap, Dwell or Gesture?: Exploring Head-Based Text Entry Techniques for HMDs" CHI 2017, May 6-11, 2017; 10 pages.

(Continued)

*Primary Examiner* — Rami R Okasha
(74) *Attorney, Agent, or Firm* — Procopio, Cory, Hargreaves & Savitch LLP (57) ABSTRACT

Authenticating for a virtual reality (VR) system using a plurality of factors of authentication, including: collecting a password entered into a virtual keyboard for a first factor of the plurality of factors of authentication, wherein the password is entered by a user selecting a series of data including numbers, letters, or images on the virtual keyboard displayed on a display of the VR system; and collecting a biometric fingerprint from movements of the VR system for a second factor of the plurality of factors of authentication.

10 Claims, 5 Drawing Sheets

(56) References Cited

U.S. PATENT DOCUMENTS

| | | | |
|---|---|---|---|
| 2014/0077625 A1* | 3/2014 | Amagai | G06F 1/3265 307/121 |
| 2014/0101621 A1* | 4/2014 | Zhu | G06F 3/017 715/863 |
| 2014/0125574 A1* | 5/2014 | Scavezze | H04W 12/06 345/156 |
| 2015/0010177 A1* | 1/2015 | Kwon | H04R 25/00 381/314 |
| 2015/0153913 A1 | 4/2015 | Ballard et al. | |
| 2015/0135309 A1* | 5/2015 | Karmarkar | G06K 9/00617 726/19 |
| 2015/0137937 A1* | 5/2015 | Smith | G06F 3/017 340/5.52 |
| 2015/0138074 A1* | 5/2015 | Hennelly | G06F 3/012 345/156 |
| 2015/0153571 A1* | 6/2015 | Ballard | H04L 12/1822 345/8 |
| 2015/0213244 A1* | 7/2015 | Lymberopoulos | H04L 63/0861 726/18 |
| 2015/0346834 A1* | 12/2015 | Martinez Fernandez | G06F 3/017 340/12.5 |
| 2015/0355721 A1* | 12/2015 | Moore | G06V 40/28 715/863 |
| 2016/0048161 A1* | 2/2016 | Carceroni | G06F 1/3206 361/679.03 |
| 2016/0350761 A1* | 12/2016 | Raziel | G06Q 20/40145 |
| 2016/0358181 A1* | 12/2016 | Bradski | G06F 3/011 |
| 2017/0032114 A1* | 2/2017 | Turgeman | G06F 3/041 |
| 2017/0160812 A1 | 8/2017 | Park et al. | |
| 2017/0235462 A1* | 8/2017 | Zhou | G06F 3/012 715/862 |
| 2017/0318019 A1* | 11/2017 | Gordon | H04L 9/3226 |
| 2017/0324726 A1 | 11/2017 | Alleaume et al. | |
| 2017/0346817 A1* | 11/2017 | Gordon | G06V 40/10 |
| 2018/0059813 A1* | 3/2018 | Li | G06F 3/038 |
| 2018/0109510 A1* | 4/2018 | Tommy | G06F 21/316 |
| 2018/0157820 A1* | 6/2018 | Adams | G06F 3/017 |
| 2018/0181737 A1* | 6/2018 | Tussy | G06F 21/32 |
| 2018/0181811 A1* | 6/2018 | Yakishyn | G06F 3/04842 |
| 2018/0275837 A1* | 9/2018 | Getz | G06F 3/017 |
| 2018/0284882 A1* | 10/2018 | Shipes | H04R 5/033 |
| 2019/0379658 A1* | 12/2019 | Wurmfeld | H04L 63/102 |
| 2020/0036937 A1* | 1/2020 | Zhou | H04N 21/44008 |
| 2020/0110862 A1* | 4/2020 | Derakhshani | G06F 21/32 |
| 2020/0133392 A1* | 4/2020 | Byerley | G09G 5/006 |
| 2020/0134145 A1* | 4/2020 | Bapst | G06F 21/45 |
| 2020/0143154 A1* | 5/2020 | Ette | G06F 3/017 |
| 2020/0210561 A1* | 7/2020 | Fu | H04W 12/122 |
| 2020/0312035 A1* | 10/2020 | Ebert | G06F 3/011 |
| 2022/0026982 A1* | 1/2022 | Kong | G06F 3/14 |

FOREIGN PATENT DOCUMENTS

| | | | | |
|---|---|---|---|---|
| EP | 3163402 A1 * | 5/2017 | | G06F 1/163 |
| WO | 20170196928 A1 | 11/2017 | | |
| WO | WO-2017196928 W | 11/2017 | | |

OTHER PUBLICATIONS

Tolle et al. "Design of Keyboard Input Control for Mobile Application using Head Movement Control Systems (HEMOCS)" ICACSIS 2016; 7 pages.

Gizatdinova et al. "Face Typing: Vision-Based Perceptual Interface for Hands-Free Text Entry with a Scrollable Virtual Keyboard" IEEE Xplore: Mar. 5, 2012; 7 pages.

International Search Report and Written Opinion, issued in related application PCT/US2020/015703, dated May 21, 2020, 6 pages.

Verma Rakesh et al: "Unsure How to Authenticate on Your VR Headset?: Come on, Use Your Head!", Proceedings of the Fourth ACM International Workshop on Security and Privacy Analytics, Mar. 21, 2018 (Mar. 21, 2018), pp. 23-30, XP055878590, New York, NY, USA DOI: 10.1145/3180445.3180450 ISBN: 978-1-4503-5634-3 Retrieved from the Internet: URL:https://dl.acm.org/doi/pdf/10.1145/3180445.3180450.

Yi Shanhe et al: "GlassGesture: Exploring head gesture interface of smart glasses", IEEE Infocom 2016—The 35th Annual IEEE International Conference On Computer Communications, IEEE, Apr. 10, 2016 (Apr. 10, 2016), pp. 1-9, XP032930176, DOI: 10.1109/INFOCOM.2016.7524542 [retrieved on Jul. 27, 2016].

Shukla Diksha Dshukla@Syr Edu et al: "Beware, Your Hands Reveal Your Secrets!",Theory Of Computing, ACM, 2 Penn Plaza, Suite 701 New York NY 10121-0701 USA, Nov. 3, 2014, pp. 904-917, XP058696814.

* cited by examiner

MULTI-FACTOR AUTHENTICATION FOR VIRTUAL REALITY

BACKGROUND

Field

The present disclosure relates to a virtual reality (VR) system, and more specifically, to multi-factor authentication for the VR system.

Background

Since virtual reality (VR) is spreading, some VR applications may access sensitive or confidential information in the future. Thus, in the future, more robust authentication may be required.

Currently, most VR systems use a virtual keyboard displayed in a head-mounted display (HMD) to enter digital information. In these systems, the user activates the keyboard using either hand gesture recognition with data gloves or a wand pointing to the displayed keys. However, these types of user interfaces are complicated and cumbersome.

SUMMARY

The present disclosure provides for a multi-factor authentication suited for the VR system using the head-mounted display (HMD).

In one implementation, a method of authenticating for a VR system using a plurality of factors of authentication is disclosed. The method includes: collecting a password entered into a virtual keyboard for a first factor of the plurality of factors of authentication, wherein the password is entered by a user selecting a series of data including numbers, letters, or images on the virtual keyboard displayed on a display of the VR system; and collecting a biometric fingerprint from movements of the VR system for a second factor of the plurality of factors of authentication. In one implementation, the VR system is a head-mounted display (HMD). In one implementation, the method further includes displaying the virtual keyboard on a half sphere in a fixed position within the half sphere. In one implementation, the virtual keyboard is arranged as a random display of at least ten keys on the half sphere. In one implementation, the password is entered by gazing in a direction of a button on the virtual keyboard to select the button. In one implementation, the selected button is validated by making a pre-defined acknowledging head gesture. In one implementation, selection of the selected button is removed by making a pre-defined unselecting head gesture. In one implementation, the biometric fingerprint is collected from the movements of the VR system as reflected in the pre-defined acknowledging head gesture and the pre-defined unselecting head gesture. In one implementation, collecting the biometric fingerprint includes: measuring accelerations of the pre-defined acknowledging head gesture and the pre-defined unselecting head gesture; and normalizing the accelerations. In one implementation, the method further includes comparing the collected biometric fingerprint to fingerprints in a fingerprint database; and identifying the user when a fingerprint match is made. In one implementation, the fingerprint match means that a similarity of the collected biometric fingerprint and a reference fingerprint of the fingerprint match are within a defined boundary.

In another implementation, a system of authenticating for a VR system using a plurality of factors of authentication is disclosed. The system includes: a first factor of authentication collector configured to collect a password entered into a virtual keyboard, wherein the password is entered by a user selecting a series of data including numbers or images on the virtual keyboard displayed on a display of the VR system; and a second factor of authentication collector configured to collect a biometric fingerprint from movements of the VR system.

In one implementation, the VR system is a head-mounted display (HMD). In one implementation, the system further includes a projector configured to display the virtual keyboard on a half sphere in a fixed position within the half sphere. In one implementation, the virtual keyboard is arranged as a random display of at least ten keys on the half sphere. In one implementation, the second factor of authentication collector is configured to collect the biometric fingerprint from the movements of the VR system as reflected in pre-defined head gestures. In one implementation, the second factor of authentication collector collects the biometric fingerprint by measuring accelerations of the pre-defined head gestures. In one implementation, the system further includes a comparator configured to compare the collected biometric fingerprint to fingerprints in a fingerprint database; and an identifier configured to identify the user when a fingerprint match is made.

In yet another implementation, an apparatus for authenticating for a VR system using a plurality of factors of authentication is disclosed. The apparatus includes: a first means for collecting a password entered into a virtual keyboard for a first factor of the plurality of factors of authentication, wherein the password is entered by a user selecting a series of data including numbers or images on the virtual keyboard displayed on a display of the VR system; and a second means for collecting a biometric fingerprint from movements of the VR system for a second factor of the plurality of factors of authentication.

In one implementation, the second means for collecting collects the biometric fingerprint from the movements of the VR system as reflected in pre-defined head gestures. In one implementation, the second means for collecting collects the biometric fingerprint by measuring accelerations of the pre-defined head gestures.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, current virtual reality (VR) systems may use complicated and cumbersome user interfaces.

Certain implementations of the present disclosure provide for a multi-factor authentication suited for the VR system using the head-mounted display (HMD). For example, the multi-factor authentication uses at least two of: (1) something the user knows, e.g., a password; (2) something the user owns, e.g., a mobile phone or physical token; and (3) something the user is, e.g., the user's fingerprints, voice, or characteristic motions. In one implementation, a fingerprint may include a biometric signature. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, the multi-factor authentication includes entering a password and collecting a biometric fingerprint, while wearing the HMD. For example, the user enters a password by watching a sequence of keys to select a series of data such as numbers, letters, symbols, and/or images on the virtual keyboard displayed in the HMD. The biometric fingerprint can be collected by monitoring the movement of the system, such as as HMD movement (which represents the movement of the user's head) or movement of the user, such as hand or body movement (e.g., captured by a camera).

In a particular implementation of the first factor authentication (i.e., entering the password), following steps may be taken after a user puts on an HMD. Initially, an application of a VR system displays in the HMD, a virtual keyboard. For example, a numerical keypad for entering the personal identification number (PIN) may be displayed in the HMD.

Figure 1:
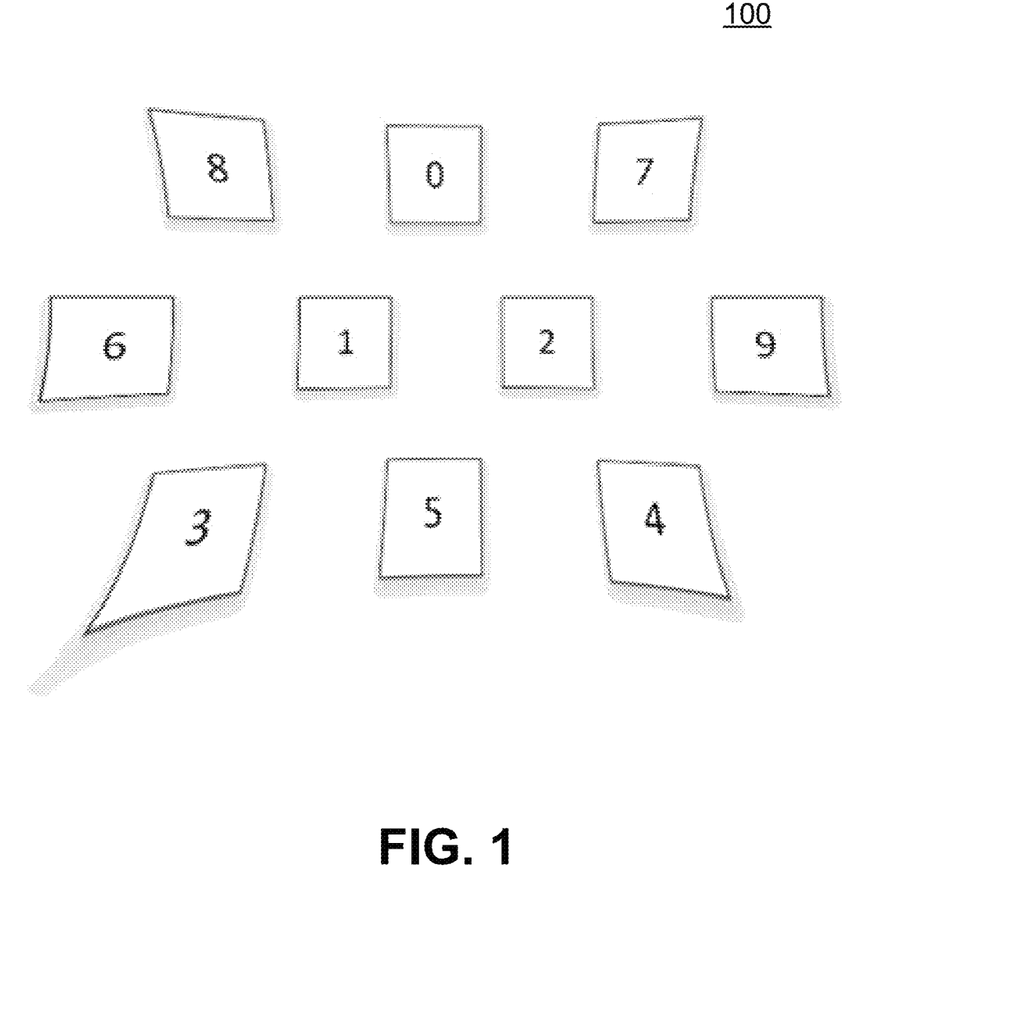
FIG. 1 is a layout of a virtual keypad displayed on a sphere in accordance with one implementation of the present disclosure.

FIG. 1 is a layout 100 of a virtual keyboard or keypad displayed on a sphere in accordance with one implementation of the present disclosure. In this implementation, the virtual keypad (which may be configured as an ordered keyboard or random display of numbers) is in a fixed position within the sphere on which the HMD displays and the user views the keypad. In one implementation, a six-digit PIN may be used as the password. Thus, the application displays a keypad of ten buttons in the half-sphere in front of the user. The order of the ten buttons is randomized.

In one implementation, to select a key on the keypad for entering the password, the user moves the head in the direction of the button (or key or other displayed virtual items). The button that is gazed by the user is then highlighted as the selected button. The user validates the selected button by making a predefined acknowledging head gesture such as a vertical nod. The highlighting of the selected button may be removed by a predefined unselecting head gesture such as a horizontal nod. Thus, the user enters the password with a succession of gazing to the key to be selected and acknowledging/unselecting with head gestures.

In one implementation, for security reasons, the layout of the virtual keypad is at least randomized for each new entry of the password. Thus, the randomization of the layout prevents leakage of the password (by watching the head movements) to the unauthorized persons. In some implementations, the layout may even be randomized after each key selection to prevent the leakage of the information (i.e., the password). In another implementation, the password is a sequence of pictograms to be spotted in a landscape rather than alphanumerical characters.

In a particular implementation of the second factor authentication (i.e., the biometrics), the application of the VR system measures the biometrics to generate the biometric fingerprint. As for gait or manuscript signatures, the movements of the user's head for a known gesture are unique to the user. For example, the acknowledging head gesture and the unselecting head gesture may serve that purpose. In one implementation, the biometrics is measured as acceleration projected on two axes of the head for both the acknowledging and unselecting gestures. Once normalized, the parameters (e.g., the acceleration) of the gestures form a unique biometric fingerprint.

In biometrics systems, an initial registration phase records several instances of the gestures or movements. For the initial registration phase, the user repetitively performs the acknowledging head gesture and the unselecting head gesture. Thus, the registration phase normalizes the entries and averages them to generate a reference fingerprint. During selection of the keys, the application records the successively captured biometric fingerprint.

In one implementation, the application of the VR system has access to a fingerprint database. For each registered user, the fingerprint database holds a record that includes a user ID (which identifies the user unambiguously) and the reference fingerprint of the user. In one implementation, the reference fingerprint is a series of data $AR_j=\{\delta x_j, \delta y_j\}$, where $\delta x$ represents azimuth acceleration and $\delta y$ represents elevation acceleration. This series is defined after a typical biometrics registration phase, wherein the user performs several acknowledging head gestures and the registration performs normalization and statistics calculation to extract the "average" fingerprint for the user.

To authenticate the user, the application may verify two conditions: (1) the password entered via the virtual keypad matches the password of the user; and (2) at least one of the measured biometric fingerprints matches the reference fingerprints of the user (i.e., the user is validated). In one implementation, the fingerprint match means that the similarity of the measured biometric fingerprint and the reference fingerprint are within a defined boundary.

Figure 2:
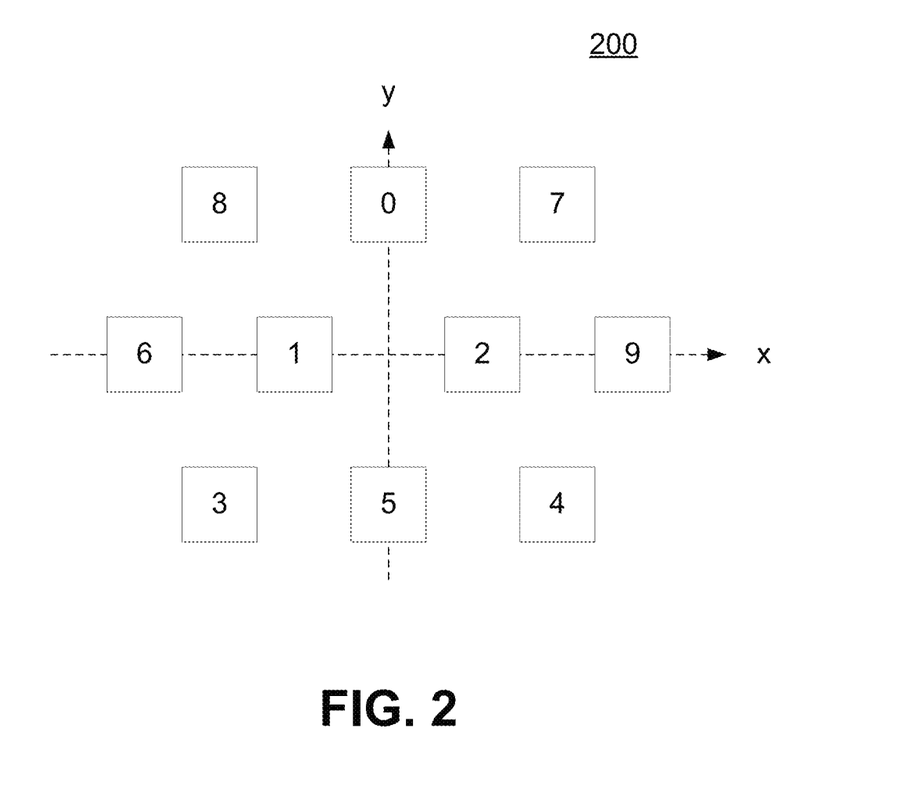
FIG. 2 is a layout of the virtual keypad displayed on the sphere but projected in a polar coordinate in accordance with one implementation of the present disclosure.

FIG. 2 is a layout 200 of the virtual keypad displayed on the sphere but projected in a polar coordinate in accordance with one implementation of the present disclosure. The horizontal axis (i.e., the x-axis) represents the azimuth, whereas the vertical axis (i.e., the y-axis) represents the elevation. The origin is the direction of the HMD when starting the authentication process.

In one implementation, each displayed button or key (i.e., $K_i$) is represented by a triplet, $K_i=\{x_i, y_i, V_i\}$, where: $x_i$ represents the azimuth of the center of the displayed key in degrees and $x_i \in ]-90, 90[$; $y_i$ represents the elevation of the center of the displayed key in degrees and $y_i \in ]-90, 90[$; and $V_i$ represents the value of the key and $V_i \in \{0 \ldots 9\}$. Thus, in the illustrated implementation of FIG. 2, $K_1=\{0, 30, 0\}$ and $K_4=\{-60, 0, 6\}$.

In one implementation, the HMD periodically reports the direction of the user's head (i.e., the gaze) to the application in the form of polar coordinates, $\{x_{user}, y_{user}\}$. Thus, initially, the application determines that the user is looking at $K_i$ if both conditions in Equation [1] are true.

$$\begin{cases} |x_{user} - x_i| \le R \\ |y_{user} - y_i| \le R \end{cases}, \quad [1]$$

where R represents a fixed value. In one implementation, value R is the radius of the circle encompassing the key.

In one implementation, the process of selecting a key is as described below.

First, when the application determines that the user is watching or gazing at a key (i.e., Equation [1] is satisfied for one value of i), the application graphically highlights the gazed key. When the user gazes away from the key (i.e., Equation [1] is no longer met for the corresponding value of i), then the application removes the highlight.

Second, if the key is highlighted for a given period of time (e.g., 100 mS), then the application enters the head gesture detection mode having three sub-modes. In the first sub-mode, if the acknowledging head gesture is detected, then the application records the key selection by using the value $V_i$. Visible information and audible signal may inform the user of the key selection. The application also records the measured biometric fingerprint. In the second sub-mode, if the unselecting head gesture is detected, then the application removes the highlight of the selected key. In the third sub-mode, if no known gesture is detected, then the application removes the current highlight.

In one implementation, the password acquisition process waits for the user to select a predetermined number of keys (e.g., after six keys are selected). Once the predetermined number of keys is selected, the application enters the authentication verification phase.

In another implementation, the HMD is configured with an eye-gaze or eye-movement tracking system that registers the direction of the eye-gaze or eye-movement in the visor rather than the position of the HMD. In this implementation, the coordinates $\{x_{user}, y_{user}\}$ are a combination of the position of the HMD and the direction of the eye-gaze. Thus, this implementation allows a selection of the key with less head movements. This may be especially useful for relatively large keyboards (e.g., larger than numerical keypads with ten keys). In this implementation, only the acceleration of the HMD is used to derive the measured biometric fingerprint (i.e., the eye tracking information is not used to derive the measured biometric fingerprint).

In one implementation, in detecting head gestures, the vertical nod of the user's head is considered an acknowledging head gesture, while the horizontal node is considered an unselecting head gesture.

In one implementation, to detect a head gesture, the application records the acceleration of the head in the polar coordinate system every n milliseconds during a predetermined number of seconds. Thus, the application has a series of samples $A_j = \{\delta x_j, \delta y_j\}$, where $\delta x_j$ represents the azimuth acceleration during the interval j, and $\delta y_j$ represents the elevation acceleration during the same interval j.

In one implementation, the process of detecting the acknowledging head gesture and the unselecting head gesture may be divided into four phases. For example, Phase 1 represents a pause in which the HMD is "still" (which means that the user does not move perceptibly). Phase 2 represents the movement in a first direction (e.g., up or down for the acknowledging head gesture, and right or left for the unselecting head gesture). Phase 3 represents the movement in a second direction that is in reverse from the first direction (i.e., if the first direction is up, then the second direction is down, if the first direction is right, then the second direction is left, and vice versa). Phase 4 represents a pause in which the HMD is "still".

In one implementation, a set of parameters (listed below) characterizes the above-described phases.

$\varepsilon_{still}$=threshold of acceleration for a pause.
$\varepsilon_{move}$=threshold of acceleration for a nod.
$\Delta_{still}$=minimal duration of a pause (i.e., Phases 1 & 4).
 The unit of this parameter ($\Delta_{still}$) is the number of measurement periods. Thus, the actual minimal duration of a pause is $\Delta_{still} \times n$ milliseconds
$\Delta_{mov1}$=minimal duration of first movement (i.e., Phase 2).
$\Delta_{mov2}$=minimal duration of second movement (i.e., Phase 3).
$\Delta_{max}$=maximum duration of each phase (i.e., if a phase is not completed within $\Delta_{max} \times n$ milliseconds, then the phase failed).

A sample $A_j$ belongs to one of the following categories; still, up, down, right, left or bad. The following set of equations defines the categorization:

$$A_j \begin{cases} |\delta x_j| < \varepsilon_{still}, \; |\delta y_j| < \varepsilon_{still} \to \text{Cat} = \text{still} \\ |\delta x_j| < \varepsilon_{still}, \; \delta y_j > \varepsilon_{mov} \to \text{Cat} = \text{up} \\ |\delta x_j| < \varepsilon_{still}, \; -\delta y_j > \varepsilon_{mov} \to \text{Cat} = \text{down} \\ |\delta y_j| < \varepsilon_{still}, \; \delta x_j > \varepsilon_{mov} \to \text{Cat} = \text{right} \\ |\delta y_j| < \varepsilon_{still}, \; -\delta x_j > \varepsilon_{mov} \to \text{Cat} = \text{left} \\ |\delta x_j| > \varepsilon_{mov}, \; |\delta y_j| > \varepsilon_{mov} \to \text{Cat} = \text{bad} \end{cases} \quad [2]$$

Once the parameters are defined as described above, the following process defines a successful or failed completion of a phase.

Figure 3:
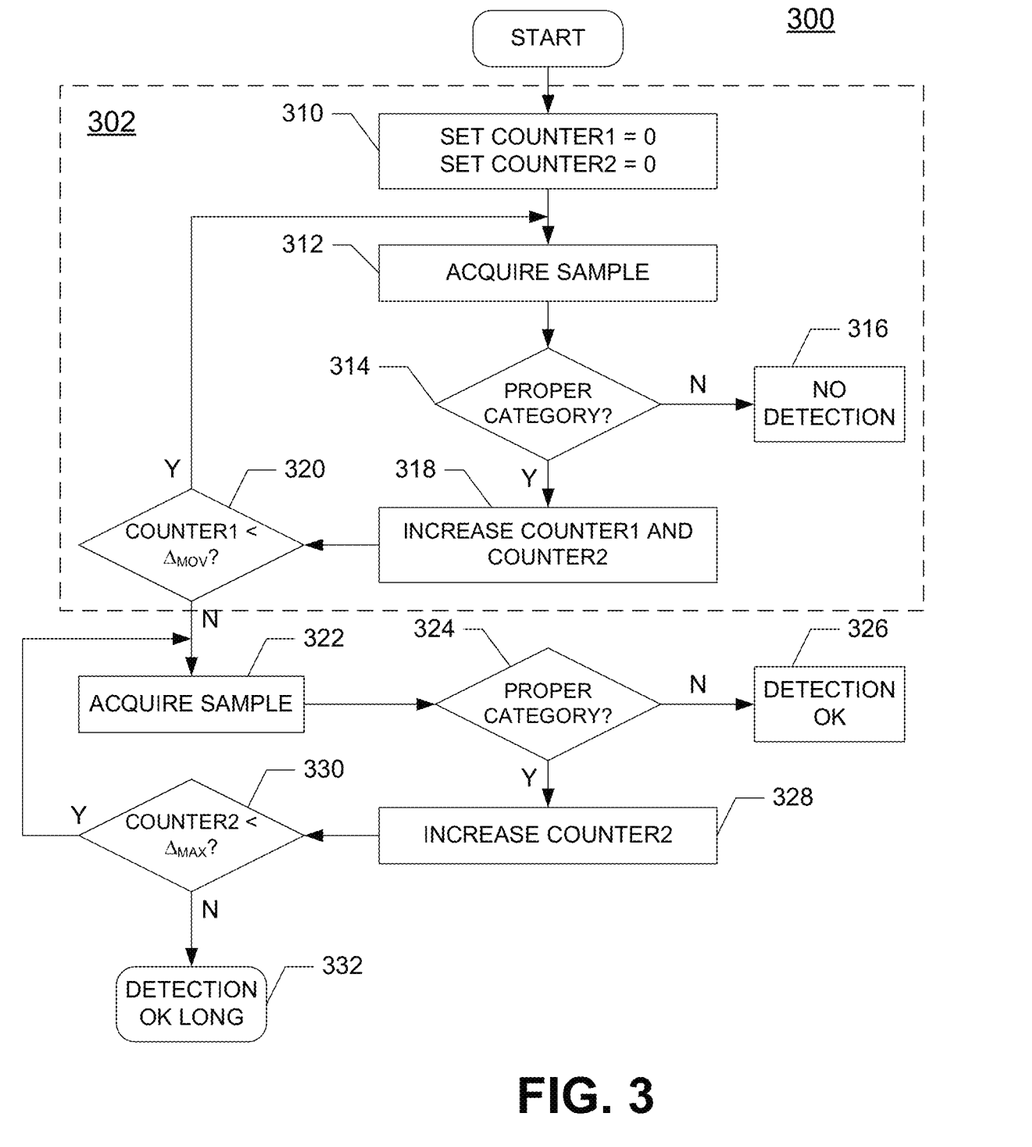
FIG. 3 is a flow diagram illustrating a process for detecting phases in accordance with one implementation of the present disclosure.

FIG. 3 is a flow diagram illustrating a process 300 for detecting phases in accordance with one implementation of the present disclosure. In one implementation, the process 300 verifies whether there are $\Delta_{mov}$ successive samples that are of the expected category, at block 302. For Phase 1 and Phase 4, the category is still, and $\Delta_{mov} = \Delta_{still}$. For Phase 2, the category is down for the acknowledging head gesture and right for the unselecting head gesture, and $\Delta_{mov} = \Delta_{mov1}$. For Phase 3, the category is up for the acknowledging head gesture and left for the unselecting head gesture, and $\Delta_{mov} = \Delta_{mov2}$. If there are not enough successive samples, then the detection fails, at block 316.

If there are enough samples, then the process waits until a sample has an unexpected category, at block 324, or the total number of analyzed samples reaches the threshold $\Delta_{max}$, at block 330. In the first case (i.e., there is an unexpected category where the user initiates another "movement", for example, from up to down), the detection is successful, at block 326. In the second case (i.e., the user stayed a long time in the same category, for example, a long pause), the detection is successful but too long, at block 332.

In a particular implementation, initially, counter1 and counter2 are both set to 0, at block 310. A sample is acquired, at block 312, and a determination is made, at block 314, whether the sample is a proper category. If the sample is not the proper category, then the detection fails, at block 316. Otherwise, if the sample is the proper category, then the both counters counter 1 and counter2 are increase, at block 318. A determination is the made, at block 320, whether counter1 less than $\Delta_{mov}$. If counter1 is less than $\Delta_{mov}$, the more sample is acquired, at block 312. Otherwise the sample is acquired, at block 322, to determine, at block 324, whether the acquired sample is an unexpected category, or the total number of analyzed samples has reached the threshold $\Delta_{max}$. If it is determined, at block 324, that the acquired sample is an unexpected category, then the detection is declared successful, at block 326. Otherwise, if it determined, at block 324, that the acquired sample is a proper category, then counter2 is increased, at block 328. A determination is then made, at block 330, whether the total number of analyzed samples has reached the threshold (i.e., counter2<$\Delta_{max}$). If the total number of samples has reached the threshold, the detection is declared successful but too long, at block 332. Otherwise, another sample is acquired, at block 322.

Figure 4:
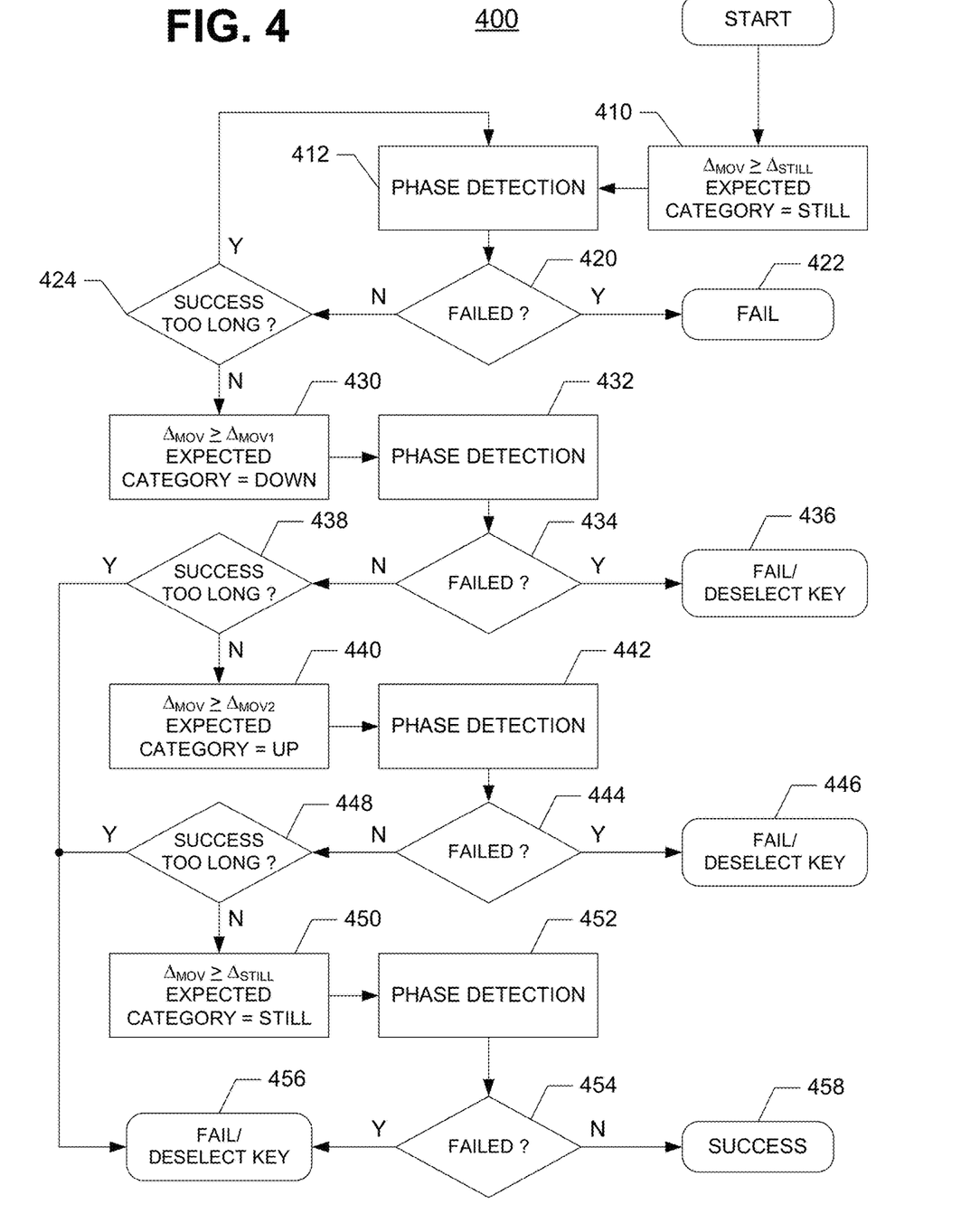
FIG. 4 is a flow diagram illustrating a process for detecting an acknowledging head gesture in accordance with one implementation of the present disclosure.

FIG. 4 is a flow diagram illustrating a process 400 for detecting an acknowledging head gesture in accordance with one implementation of the present disclosure. The process 400 describes a series of phase detecting steps.

In the illustrated implementation of FIG. 4, the process 400 attempts to detect phase 1 by determining, at block 410, that the duration of the movement ($\Delta_{mov}$) should be equal to or greater than the minimal duration for a pause ($\Delta_{still}$), wherein the expected category is "still" (phase 1). Then, the phase 1 detection is performed, at block 412. If the phase detection fails, at block 420, the phase detection is declared failed, at block 422, which means that the user's head has moved. If it is determined, at block 424, that the phase detection was a success but the duration of the pause was too long, the detection is continued, at block 412, until proper phase 1 is determined, at block 424.

In the illustrated implementation of FIG. 4, once phase 1 has been detected, the process 400 attempts to detect phase 2 (i.e., the user's head moving down) by determining, at block 430, that the duration of the movement ($\Delta_{mov}$) should be equal to or greater than the minimal duration for the first movement ($\Delta_{mov1}$), wherein the expected category is "down" (phase 2). Then, the phase 2 detection is performed, at block 432. If the phase detection fails, at block 434, the overall detection is declared failed and the key is deselected, at block 436. If it is determined, at block 438, that the phase detection was a success but the duration of the first movement ($\Delta_{mov1}$) was too long, then the overall detection is declared failed and the key is deselected, at block 456.

In the illustrated implementation of FIG. 4, once phase 2 has been detected, the process 400 attempts to detect phase 3 (i.e., the user's head moving up) by determining, at block 440, that the duration of the movement ($\Delta_{mov}$) should be equal to or greater than the minimal duration for the second movement ($\Delta_{mov2}$), wherein the expected category is "up" (phase 3). Then, the phase 3 detection is performed, at block 442. If the phase detection fails, at block 444, the overall detection is declared failed and the key is deselected, at block 446. If it is determined, at block 448, that the phase detection was a success but the duration of the second movement ($\Delta_{mov2}$) was too long, then the overall detection is declared failed and the key is deselected, at block 456.

In the illustrated implementation of FIG. 4, once phase 3 has been detected, the process 400 attempts to detect phase 4 (i.e., the user stayed still) by determining, at block 450, that the duration of the movement ($\Delta_{mov}$) should be equal to or greater than the minimal duration for the pause ($\Delta_{still}$), wherein the expected category is "still" (phase 4). Then, the phase 4 detection is performed, at block 452. If the phase detection fails, at block 454, the overall detection is declared failed and the key is deselected, at block 456. If it is determined, at block 454, that the phase detection was a success regardless of its length, then the overall detection is declared a success, at block 458.

The illustrated implementation of FIG. 4 can be extended to a second process for detecting an unselecting head gesture. Thus, in the second process, phases 2 and 3 would use the parameters for horizontal nodding instead of the vertical nodding for the process 400.

In an alternative implementation to the illustrated implementation of FIG. 4, the direction of the vertial nodding is selected to be up for phase 2 and the reverse (i.e., down) for phase 3.

Figure 5:
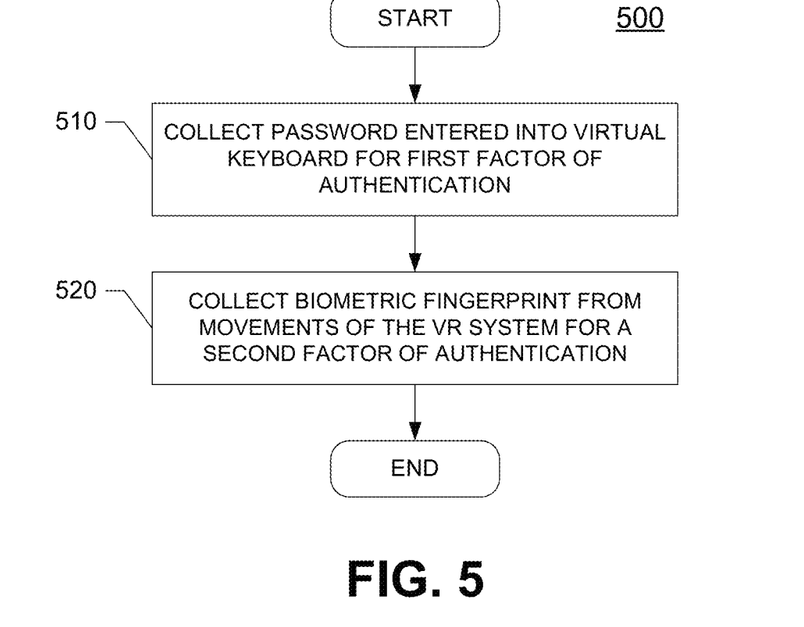
FIG. 5 is a flow diagram illustrating a process for authenticating for a VR system using a plurality of factors of authentication in accordance with one implementation of the present disclosure.

FIG. 5 is a flow diagram illustrating a process 500 for authenticating for a VR system using a plurality of factors of authentication in accordance with one implementation of the present disclosure. In one implementation, the process 500 collects a password entered into a virtual keyboard for a first factor of the plurality of factors of authentication, at block 510, wherein the password is entered by a user selecting a series of data including numbers and/or images on the virtual keyboard displayed on a display of the VR system. Then, at block 520, a biometric fingerprint is collected from movements of the VR system for a second factor of the plurality of factors of authentication.

Figure 6:
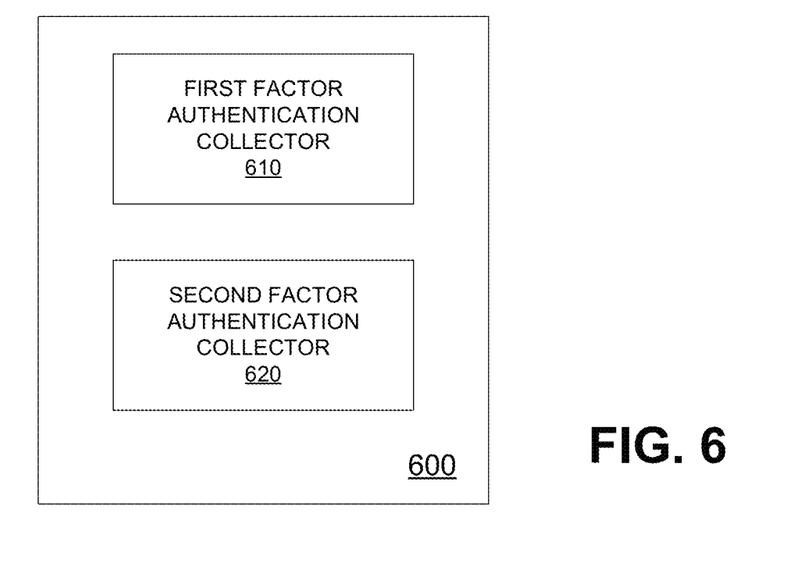
FIG. 6 is a block diagram illustrating a system for authenticating for a VR system using a plurality of factors of authentication in accordance with one implementation of the present disclosure.

FIG. 6 is a block diagram illustrating a system 600 for authenticating for a VR system using a plurality of factors of authentication in accordance with one implementation of the present disclosure. In one implementation, the system 600 includes a first factor of authentication collector 610 and a second factor of authentication collector 620. In one implementation, the first factor of authentication collector 610 is configured to collect a password entered into a virtual keyboard, wherein the password is entered by a user selecting a series of data including numbers and/or images on the virtual keyboard displayed on a display of the VR system. In one implementation, the second factor of authentication collector 620 is configured to collect a biometric fingerprint from movements of the VR system.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method of authenticating for a virtual reality (VR) system using a plurality of factors of authentication, the method comprising:
    collecting a password entered into a virtual keyboard for a first factor of the plurality of factors of authentication, wherein the password is entered by a user gazing at and selecting a series of data including numbers, letters, or images on the virtual keyboard randomly projected in polar coordinates on a display of the VR system such that each data of the series of data projected on the display is represented by an azimuth angle and an elevation angle;
    collecting a biometric fingerprint from movements of the VR system for a second factor of the plurality of factors of authentication,
    wherein the biometric fingerprint is collected from detecting head gestures of the user including at least one of head movements and eye gazes using the VR system,
    wherein a pre-defined acknowledging head gesture and a pre-defined unselecting head gesture are detected using a combination of phases including: a first pause in which the VR system is still; a movement of the VR system in a first direction; a movement of the VR system in a second direction opposite to the first direction; and a second pause in which the VR system is still;
    wherein the biometric fingerprint is measured as acceleration projected on two axes of the polar coordinates,
    wherein the projected acceleration is generated by:
    measuring a first measured acceleration of the pre-defined acknowledging head gesture; measuring a second measured acceleration of the pre-defined unselecting head gesture; and normalizing the first and second measured accelerations.

2. The method of claim 1, wherein the VR system is a head-mounted display (HMD).

3. The method of claim 1, further comprising
    displaying the virtual keyboard on a half sphere in a fixed position within the half sphere.

4. The method of claim 3, wherein the virtual keyboard is arranged as a random display of at least ten keys on the half sphere.

5. The method of claim 1, wherein the password is entered by gazing in a direction of a button on the virtual keyboard to select the button.

6. The method of claim 5, wherein the selected button is validated by making the pre-defined acknowledging head gesture.

7. The method of claim 6, wherein selection of the selected button is removed by making the pre-defined unselecting head gesture.

8. The method of claim 7, wherein the biometric fingerprint is collected from the movements of the VR system as reflected in the pre-defined acknowledging head gesture and the pre-defined unselecting head gesture.

9. The method of claim 1, further comprising:
    comparing the collected biometric fingerprint to fingerprints in a fingerprint database; and
    identifying the user when a fingerprint match is made.

10. The method of claim 9, wherein the fingerprint match means that a similarity of the collected biometric fingerprint and a reference fingerprint of the fingerprint match are within a defined boundary.

* * * * *